April 19, 1927.
C. A. TREDWELL
1,625,510
TELESCOPIC FISHING ROD
Filed Oct. 14, 1924
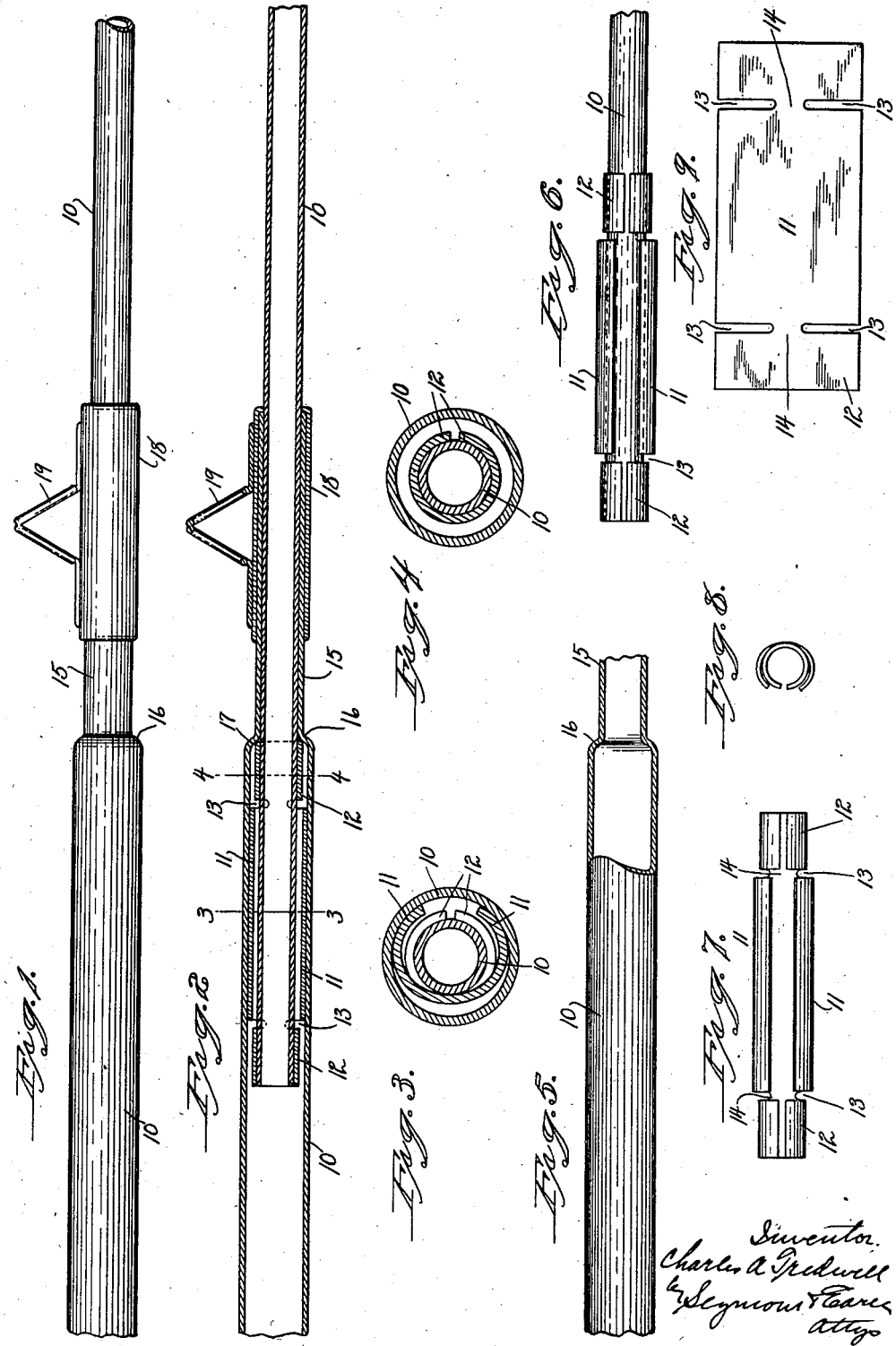

Patented Apr. 19, 1927.

1,625,510

UNITED STATES PATENT OFFICE.

CHARLES A. TREDWELL, OF NEW HAVEN, CONNECTICUT, ASSIGNOR TO WINCHESTER REPEATING ARMS CO., OF NEW HAVEN, CONNECTICUT.

TELESCOPIC FISHING ROD.

Application filed October 14, 1924. Serial No. 743,528.

Fig. 1 is a broken view, in side elevation, of a telescopic fishing-rod, constructed in accordance with my invention.

Fig. 2 is a view thereof in central, longitudinal section.

Fig. 3 is a view thereof, on a larger scale, in transverse section, on the line 3—3 of Fig. 2.

Fig 4 is a similar view on the line 4—4 of Fig. 2.

Fig. 5 is a broken view, partly in side elevation and partly in longitudinal section, of the upper end of one of the joint-sections, showing the bearing-sleeve formed by reducing the same.

Fig. 6 is a broken view, in side elevation, showing the lower end of the complementary joint-section as provided with my improved friction-sleeve.

Fig. 7 is a detached view, in side elevation, of the friction-sleeve.

Fig. 8 is a view thereof in end elevation.

Fig. 9 is a plan view of the blank from which it is formed.

My invention relates to an improvement in telescopic fishing-rods, the object being to provide cheap, simple and efficient means for creating the friction required to maintain their several joints in their extended or telescoped relations.

With these ends in view, my invention consists in a telescopic fishing-rod characterized by the provision of its joint-sections, with the exception of its butt-section, with a laterally expansible but longitudinally non-extensible supplemental friction-sleeve which is provided at its ends with integral tubular clips separated from its ends by transverse slots.

In carrying out my invention, as herein shown, I provide each joint-section 10 of the rod with a laterally expansible but longitudinally non-extensible sheet-metal friction-sleeve 11, provided at its respective ends with corresponding tubular clips 12 formed integral with it, but separated from it by transverse slots 13, the sleeve and clips being joined by integral webs 14 produced by the limitation of the slots. Friction-sleeves so produced are secured upon the lower end of each of the joint-sections 10 by brazing or otherwise fastening their clips 12 thereto, whereby their sleeves 11 are left free for lateral expansion within the upper end of the complementary joint-section with which they have friction bearing throughout their length, but no longitudinal extension. The upper end of the complementary joint-section is reduced in diameter to form a bearing-sleeve 15, resulting in the production of a stop-shoulder 16 which co-acts with the upper end of the friction-sleeve 11 at the point 17 to prevent the separation of the respective joint-sections.

Each joint-section is provided at its upper end with a band 18 carrying a line-guide 19, but the band and guide shown may be replaced by any other suitable construction answering the same purpose.

I claim:

In a fishing-rod having joint-sections which are relatively longitudinally-adjustable, the combination with two of the joint-sections thereof, of a laterally expansible but longitudinally non-extensible friction-sleeve mounted upon the lower end of one of the said joint-sections and having friction bearing in the upper end of the other joint-section, the said sleeve being provided at its respective ends with integral tubular clips respectively separated from its ends by transverse slots.

In testimony whereof, I have signed this specification.

CHARLES A. TREDWELL.